(12) United States Patent
Andersen

(10) Patent No.: US 10,139,504 B2
(45) Date of Patent: Nov. 27, 2018

(54) DISTRIBUTED SEISMIC SOURCE ARRAY FOR USE IN MARINE ENVIRONMENTS

(71) Applicant: GreenPowerUSA Inc., Chatsworth, CA (US)

(72) Inventor: James K Andersen, Woodland Hills, CA (US)

(73) Assignee: GREENPOWERUSA INC., Chatsworth, CA (US)

( * ) Notice: Subject to any disclaimer, the term of this patent is extended or adjusted under 35 U.S.C. 154(b) by 91 days.

(21) Appl. No.: 15/244,818

(22) Filed: Aug. 23, 2016

(65) Prior Publication Data

US 2016/0363677 A1 Dec. 15, 2016

Related U.S. Application Data

(63) Continuation-in-part of application No. 14/857,778, filed on Sep. 17, 2015.

(60) Provisional application No. 62/209,196, filed on Aug. 24, 2015, provisional application No. 62/052,979, filed on Sep. 17, 2014, provisional application No. 62/077,123, filed on Nov. 7, 2014, provisional application No. 62/104,025, filed on Jan. 15, 2015, (Continued)

(51) Int. Cl.
  *G01V 1/00* (2006.01)
  *G01V 1/145* (2006.01)
  *G01V 1/38* (2006.01)
  *G01V 1/153* (2006.01)
  *G01V 1/40* (2006.01)

(52) U.S. Cl.
  CPC .............. *G01V 1/145* (2013.01); *G01V 1/153* (2013.01); *G01V 1/38* (2013.01); *G01V 1/40* (2013.01)

(58) Field of Classification Search
  CPC .......... G01V 1/145; G01V 1/153; G01V 1/38; G01V 1/40
  See application file for complete search history.

(56) References Cited

U.S. PATENT DOCUMENTS 4,514,834 A * 4/1985 Hanson ................... G10K 9/10
                                                181/113
5,103,130 A    4/1992 Rolt
               (Continued)

FOREIGN PATENT DOCUMENTS

EP    2891523 A1    8/2015

OTHER PUBLICATIONS

International Search Report and Written Opinion of PCT in PCT/US 16/48201.

*Primary Examiner* — Hovhannes Baghdasaryan
(74) *Attorney, Agent, or Firm* — Roy L Anderson

(57) ABSTRACT

An acoustic sound source designed to impart vibratory energy into its surrounding environment by linearly displacing transducer face plate(s) that are coupled to a rotary motor via crankshaft/connecting rod(s) or camshaft(s). The frequency of the vibrational energy is proportional to the speed of the rotary motor and the amplitude of the vibrational energy is proportional to the linear displacement of the transducer faceplates. The motor can be manually or automatically controlled to operate at a fixed speed and/or a variety of time varying speeds such as frequency sweeps or ramps. The linear displacement or amplitude of the transducer faceplates can also be manually or automatically controlled to operate at a fixed displacement or to have the displacement vary with time and/or frequency.

22 Claims, 11 Drawing Sheets

Related U.S. Application Data provisional application No. 62/111,974, filed on Feb. 4, 2015, provisional application No. 62/159,820, filed on May 11, 2015, provisional application No. 62/182,805, filed on Jun. 22, 2015.

(56) References Cited

U.S. PATENT DOCUMENTS

| | | | |
|---|---|---|---|
| 5,757,726 A | 5/1998 | Tenghamn | |
| 6,076,629 A | 6/2000 | Tenghamn | |
| 6,085,862 A | 11/2000 | Tenghamn | |
| 7,136,324 B1 | 11/2006 | Quigley | |
| 9,158,014 B2 * | 10/2015 | Bonavides | G01V 1/143 |
| 9,535,180 B2 * | 1/2017 | Sallas | G01V 1/188 |
| 2013/0010573 A1 * | 1/2013 | Morozov | G01V 1/135 |
| | | | 367/142 |
| 2015/0085606 A1 | 3/2015 | Tenghamn | |

* cited by examiner

Camshaft Cross Section

Vibrating Plate/Piston

Springs

Connecting Rod/Pushrod

Gear Driven by Motor

Pivoted weights that fly out as gear spins

DSS marine vibrator array

Offshore Oil Platform          DSS marine vibrator array

DISTRIBUTED SEISMIC SOURCE ARRAY FOR USE IN MARINE ENVIRONMENTS

CROSS REFERENCE TO RELATED APPLICATIONS

This application is a non-provisional application which claims priority from U.S. Ser. No. 62/209,196, filed Aug. 24, 2015, the disclosure of which is specifically incorporated herein by reference in its entirety.

This application is also a continuation-in-part application of U.S. Ser. No. 14/857,778, filed Sep. 17, 2015, the disclosure of which is specifically incorporated herein by reference in its entirety.

U.S. Ser. No. 14/857,778 claims priority from the following provisional patent applications, the disclosures of each of which are specifically incorporated herein by reference in their entirety: U.S. Ser. No. 62/052,979, filed Sep. 17, 2014; U.S. Ser. No. 62/077,123, filed Nov. 7, 2014; U.S. Ser. No. 62/104,025, filed Jan. 15, 2015; U.S. Ser. No. 62/111,974, filed Feb. 4, 2015; U.S. Ser. No. 62/159,820, filed May 11, 2015; and U.S. Ser. No. 62/182,805, filed Jun. 22, 2015.

FIELD OF THE INVENTION

The present invention relates to an improved means of imparting low frequency vibrations in the earth for seismic exploration and monitoring, sonar applications, or any other application that would benefit from having a precisely controlled, small, powerful, highly efficient, reliable, and repeatable low frequency acoustic source.

BACKGROUND OF THE INVENTION

There is a growing demand for low frequency vibratory sources to replace the impulsive sound sources in current use. Impulsive sound sources used for seismic exploration and monitoring such as dynamite or air guns have been blamed for harming the environment, marine mammals, and other sea life. A vibratory source such as a marine vibrator that can impart controlled vibrations over a period of many seconds as compared to milliseconds of an impulsive source has many advantages. Impulsive sound sources create significant broad band noise (up to 1 kHz) with much of it outside the useable seismic frequency band. Although frequencies above about 100 Hz are typically not seismically useful, they are blamed for the preponderance of the harm to marine life. A controlled vibratory source that can be limited to approximately 100 Hz would eliminate this concern. In addition, a precisely controlled vibratory source that is highly repeatable can improve imaging results as compared to impulsive sources which are less repeatable.

Designing a practical low frequency marine acoustic source capable of producing useable low frequency vibrations from 1 Hz to 100 Hz is very challenging. First to be of practical size, a marine vibrator must have dimensions much smaller than the wavelength of the sound that it produces. In water for example, at 100 Hz the acoustic wavelength is about 50 feet, but an acceptable size for a marine vibrator is probably three feet or less. Achieving high power at low frequencies from a small transducer requires very large volume displacements, up to hundreds of liters of water, which is at the very limits or possibly even beyond the limits of traditional technologies. For example, one current solution uses a magnetostrictive material (Terfenol-D) with a very high displacement. But Terfenol-D which has the highest magnetostriction of any known alloy provides only about 1/16 inch of displacement from a 3-foot stack. Despite this limitation, several companies have developed innovative flextensional transducers designed to leverage these small displacements into larger displacements, but flextensional transducers are heavy, expensive, and highly resonant. Alternatively, to overcome the small displacements of piezoelectric/magnetostrictive materials, flextensional transducers using voice coil actuators as drivers have also been developed for the marine vibrator application, but they have limited output and also have problems with resonant peaks. A Gas-Filled Bubble Seismo-Acoustic device was also developed for this application but it too cannot generate the signals anywhere near the bandwidth and power needed. Whereas these traditional technologies used for creating underwater sound may be well-suited for high and mid frequency applications, they simply do not scale when attempting to produce the low frequencies needed for seismic applications (i.e., 100 Hz and lower) and therefore have not resulted in a practical solution.

SUMMARY OF THE INVENTION

The present invention is generally directed to a marine sound source configured for use in a marine environment having one or more moveable plates (which can be flexible diaphragms), a rotary motor and a connection means (either a crank shaft coupled with at least one connecting rod or a camshaft) between the rotary motor and the one or more moveable plates configured to translate rotary motion of the motor into linear motion of the one or more moveable plates.

The movable plates can be connected to an external housing via a flexible, watertight seal to form a pressure boundary between an internal portion of the housing and an external portion of the housing and the internal portion can be internally pressurized to coincide with fluid pressure external to the housing. One way of pressurizing the internal portion is to fill it with an internal fluid which equalizes with external fluid pressure via a plurality of ports in a periphery of the housing located orthogonal to a linear motion of the one or more movable plates. The internal fluid can have a higher cavitation threshold than water and be isolated from the external fluid via a bladder.

The amount of linear displacement of the one or more movable plates can be varied by passive means based upon the speed of rotation of the rotary motor. For example, changes in linear displacement can be accomplished via a spring loaded rod which decreases in length with applied load as the rotary motor increases in speed and the spring is compressed or by a mechanical linkage and movement of at least one weight due to changes in centrifugal force as the speed of the rotary motor changes. The amount of linear displacement of the one or more movable plates can also be varied by active means independently of the speed of rotation of the rotary motor.

Two opposed transducer face plates can be joined together by at least one mechanical connection to cause the two opposed transducer face plates to move in unison such that a front plate radiates pressure waves outwardly from its face in a primary sound pressure radiation direction while the second transducer face plate is a back plate. A pressure deflecting plate (which may be coupled to a weight to form a deflecting plate structure with more mass), which is preferably configured so that it has a mass many times the mass of water displaced by the front plate, can be configured so water volume displaced from the back plate is redirected orthogonal to movement of the back plate or redirected in a direction to cancel out the force from the front plate.

Alternatively, two transducers can be configured in a back to back configuration in which the primary sound pressure radiation direction from one transducer and the second primary sound pressure radiation direction from the other transducer are opposite each other and water displaced between the first transducer and the second transducer will be directed orthogonal to the movement of the first and second set of two opposed transducer face plates.

Accordingly, it is an object of the present invention to provide improved seismic sources that are used in conjunction with acoustic receivers for determining the lithology and for acoustic imaging of the subsurface of the earth in marine environments.

This and further objects and advantages will be apparent to those skilled in the art in connection with the drawings and the detailed description of the invention set forth below.

BRIEF DESCRIPTION OF THE DRAWINGS

FIG. 3 illustrates a flextensional transducer used for imparting low frequency sound waves into water while

FIG. 5 illustrates an additional pressure compensation method in accordance with the present invention used in a marine environment while

FIG. 8 illustrates how the speed of a motor changes a marine vibrator's Sound Pressure Level for a fixed displacement whereas

DETAILED DESCRIPTION OF THE INVENTION

The present invention relies upon a marine vibrator, or a series of marine vibrators aligned in an array, to radiate acoustic energy into a marine environment (i.e., a body of water, such as a lake, sea or ocean) that penetrates a solid bottom of the marine environment (e.g., lakebed, seabed or an ocean bed) which is then reflected back to receivers located either on the solid bottom or in the water of the marine environment itself. These reflections are used to generate images of the subsea surface.

Figure 15:
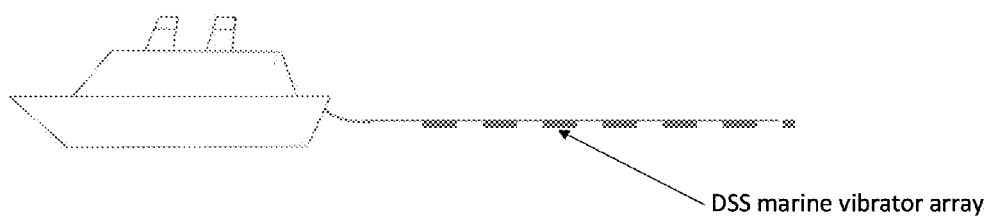
FIG. 15 illustrates an array of marine vibrators deployed attached to a ship and FIG. 16 illustrates it deployed attached to an offshore oil platform.
Figure 16:
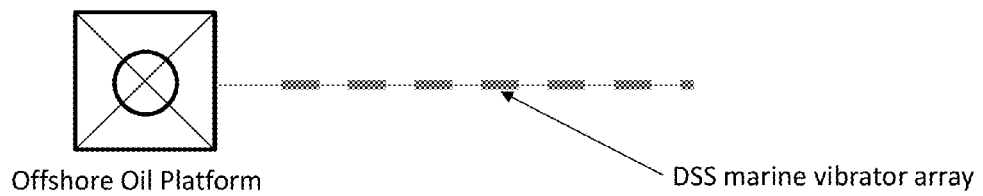

An array of marine vibrators in accordance with the present invention can be towed behind a ship (see FIG. 15), tethered from an offshore oil platform at a depth anywhere from just below the surface to the sea bottom (see FIG. 16), or it can be trenched (buried) beneath the sea floor. If placed on the sea floor bottom a cover may be placed over the marine vibrators to direct the acoustic energy into the sea bottom and limit acoustic energy from entering the seawater above (minimizing harm to sea creatures).

In the case where an array of marine vibrators is tethered to an offshore oil platform, the other end can be attached to a small craft such that it can be easily repositioned (rotated) during a seismic survey. It can also be positioned (tethered) between two boats. For the towed application, tow depth can be maintained by flotation devices, depth control buoys, or similar means. A marine vibrator may also be mounted to the underside of a boat with the source projecting energy downward.

At the most basic level, a marine vibrator must cyclically displace large volumes of water over the seismic band of interest, which for purposes of the present invention is approximately 1-100 Hz. The current invention does this by moving a large, relatively stiff plate or plates (transducer face plates). The volume displacement is determined by the area of the plate in contact with the water multiplied by the stroke or linear movement of the plate. For example, a 36-inch diameter plate has a face area of 1018 square inches. If the plate is displaced 1.5 inches, the resultant volume displacement is 1018×1.5=1527 cubic inches or approximately 25 liters. The preferred embodiment of the current invention is to use an electric motor (preferably an AC servo motor) to drive the displacement of the transducer face plate via a crankshaft and connecting rod(s). Since AC servo motors have a high and relatively constant torque from startup (0 rpm) up to their rated speed, this eliminates the "peakiness" inherent in traditional transducer designs. In addition, the servo motor is highly efficient over its entire operating speed range (transducer frequency band) unlike magnetostrictive or voice coil powered transducers. Speed control is simple and precise as the traditional servo drives incorporate positional feedback control via encoders or resolvers installed within the servo motor. Constant speed, linear ramps, non-linear ramps, and stepped ramp frequency sweeps either manual or programmed are all possible with today's servo drive controllers.

Another key feature of the current invention is the capability to adjust the displacement (stroke) of the transducer face plate(s) manually or automatically as the vibrator is operating. The output of a marine vibrator source is typically expressed as the Root Mean Square (RMS) pressure level 1 meter from the source on a decibel scale relative to 1 µPa (RMS). This is commonly referred to as the Sound Pressure Level (SPL) and given the units dB re 1 µPa for an impulsive or broadband source or dB re 1 µPa/Hz for a narrow band or frequency swept sinusoidal source. RMS values are commonly used to describe the power of continuous signals. For a fixed volume displacement, the SPL varies linearly with frequency. For example, if a 36-inch diameter plate is displaced 0.040 inches at a frequency of 100 Hz it will generate an SPL of over 200 dB re 1 µPa/Hz. However, if the vibrating frequency is reduced to 10 Hz while maintaining the same 0.040-inch displacement, the SPL will drop to below 180 dB re 1 µPa/Hz. Maintaining approximately the same SPL at 10 Hz would require a displacement of approximately 1.75 inches. This is why there is a need to adjust the displacement of the transducer face plate with frequency in order to maintain a relatively constant SPL over a desired operating frequency range.

An especially preferred embodiment of the current invention uses state-of-the-art factory automation and programmable logic technology to precisely control small powerful rotary motors that are connected via crankshaft or camshaft to drive transducer face plates at the exact displacement and force needed for the marine vibrator application. This technology is capable of producing vibrations and sound far beyond the capabilities of traditional acoustic devices, while minimizing the unnecessary out-of-band signals that can potentially harm marine life.

Another major issue facing low frequency transducer designers is the ability to maintain uniform output performance (sound pressure level) as the transducer is operated at increasingly deeper submergence depths. This is especially a problem for very low frequency transducers such as those used in the offshore seismic industry for exploration and production monitoring. For these cases, generating high sound pressure levels at low frequencies requires substantial water displacement, on the order of 10-100 liters or more. This is typically done by cyclically moving large surface(s) against the ambient water pressure at the desired operating depth. These large surfaces must operate against potentially large hydrostatic forces on one (external) side and a gas on the other (internal) side. For example, a 30-inch diameter transducer face plate has a surface area of approximately 700 square inches. Just a 1 pound per square inch (psi) difference between the internal pressure and the external hydrostatic pressure equates to 700 pounds of force that must be overcome to move the face plate (the force doubles to 1400 pounds if two opposed faceplates are used). In order to overcome this problem, transducer designers employ methods to match the external water pressure with the internal air (or other gas) pressure. This works relatively well at relatively shallow depths (i.e., 5-10 feet or less); however, most seismic surveys require operation to a depth of 35 feet (minimum) to 200 feet or more, and this is where the problem comes in.

Matching the external pressure with internal pressure is straightforward; however, the external transducer radiating surfaces (such as transducer face plates) must displace 10-100 liters of water many times per second. For example, published industry requirements require operation from 5 Hz to 100 Hz. In order to keep the transducer a reasonable size, the ratio of internal volume to swept volume of the radiating surfaces must be about 10:1 or less. So, if the displaced volume is 100 liters, the internal volume should be 1000 liters or less. At atmospheric pressure the internal volume will be at 14.7 psia. For this example, moving the face plates to displace 100 liters will cause the internal pressure to change by approximately 10% or 1.5 psi assuming ideal gas laws. Thus at normal atmospheric pressure, the transducer drive mechanism must overcome as a minimum 1.5 psi times the transducer surface area (i.e., 1400 square inches) which equates to 2100 pounds of force. This becomes a much bigger issue at deeper depths. For example, at 100 feet of water depth in order to match the external pressure the internal pressure must be maintained at approximately 44 psig (approximately 60 psia). At this depth, moving the transducer face plates to displace 100 liters will again cause the internal volume to change by 10%, but now this causes the internal pressure to change by 6 psi. 6 psi times 1400 square inches equates to 8400 pounds of force. What this means is that the majority of the power of the transducer's drive mechanism is absorbed (wasted) overcoming the internal cyclic pressure changes.

The present invention also incorporates features to eliminate the internal pressure changes brought on by movement of the transducer radiating surfaces which in our case are the transducer face plates. Basically, according to the present invention, the internal transducer volume is kept relatively constant as the transducer face plates(s) move to displace the desired external water volume. Because there is no change in internal volume as the transducer face plates move to displace the desired volume of water, there is no cyclic change in internal pressure that has to be overcome by the transducer's drive mechanism.

Figure 1:
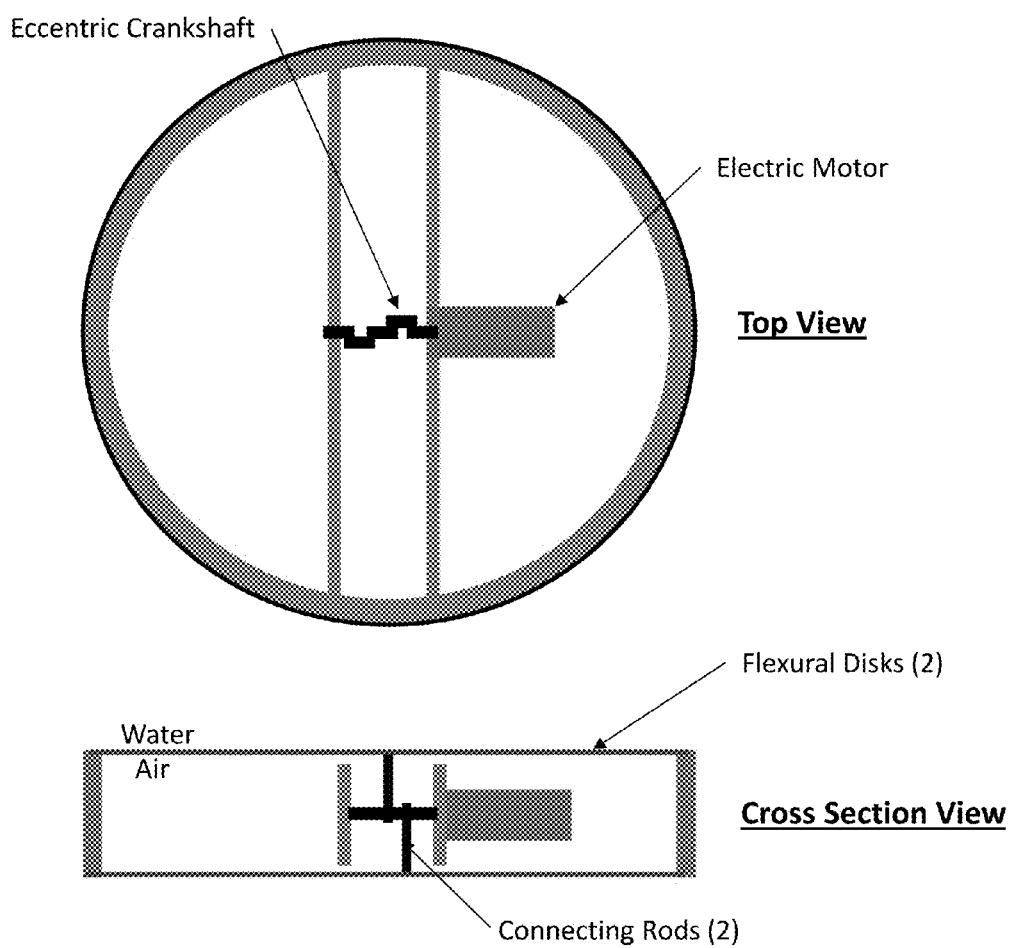
FIG. 1 shows top and cross sectional views of a marine vibrator in accordance with the present invention using an eccentric crankshaft.

FIG. 1 illustrates an embodiment of the present invention in which a motor with an eccentric crankshaft can be used to moving flexing plate(s). In this case, the eccentric crankshaft is connected to the flexural disk plates at their approximate center point via connecting rods. At least one stiff support member rigidly attached to cylindrical housing provides the means for supporting the drive motor and the crankshaft. As the crankshaft rotates it alternately pulls the two plates together and pushes them apart in unison, imparting acoustic waves into the water. The inside of the cylinder is air-filled and when the vibrator is placed in the water it will be entirely surrounded by water. The speed of the motor controls the frequency of the vibrations and it can be swept to give the desired output signal. A monitoring accelerometer can be placed on either or both of the flexural disks (on the air side) to record actual vibrator performance. The configuration described above can be modified to use just a single connecting rod to vibrate just one flexural disk so that the acoustic wave is directed to one side only. In this case, appropriate means to support and balance the marine vibrator (i.e., provide a reaction force, etc.) must be provided because the system will no longer be balanced.

In FIG. 1, the flexural disks are designed to temporarily deform (i.e., flex) with the up and down motion of the connecting rods. Alternatively, the discs can be more rigid with a piston seal or other edge type seal (designed for dynamic sealing) around their outer edge such that the whole disk moves up and down with the piston seal preventing leakage. Alternatively, the piston can be attached to the underside of a thin flexible sheet such as rubber (or reinforced rubber) with the rubber sheet attached to the outer housing forming the watertight seal. The rubber will allow up and down motion of the piston while maintaining a watertight seal. The system can pressure compensated if needed by pressurizing the internal air filled section manually or automatically to balance the force across the piston/disk to minimize the differential pressure across the disks for operation at increased water depths.

Figure 2:
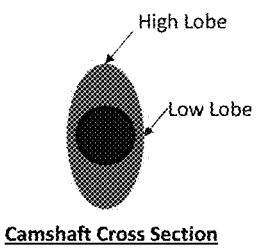
FIG. 2 illustrates an alternative embodiment of a marine vibrator camshaft cross section.

In an alternate configuration the eccentric crankshaft can be replaced by a camshaft (acting directly or via pushrods) operating against spring pressure that operates to pull the opposing disks together. The camshaft high lobes and low lobes are opposed (see FIG. 2) such that the opposing disks are pushed outward against spring pressure and pulled inward (with spring pressure) in unison. As is standard practice, cam followers can be used.

Figure 3:
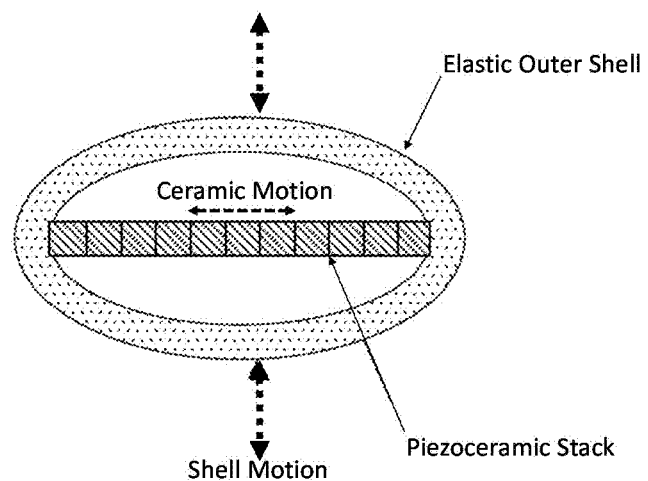
Figure 4:
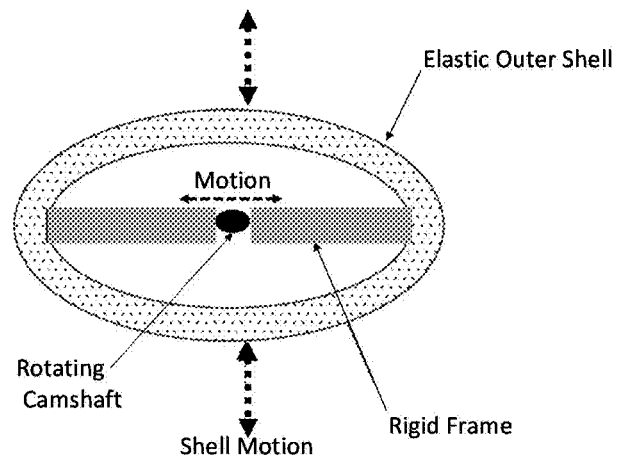
FIG. 4 illustrates how it can be replaced by a rotating camshaft in accordance with the present invention.

The most widely-used method of imparting controlled low frequency sound waves into water is the flextensional transducer (a cross section is shown in FIG. 3). Because piezo ceramic materials generate high forces but small displacements, the flextensional transducer was designed to translate small motion of the ceramic stack into large motion of the outer shell. If desired, the motor, eccentric crankshaft, and connecting rods described above can be used to replace ceramic stack in the flextensional transducer preferably acting to flex the walls of the outer elastic shell along the minor axis, however, it will work in either axis. The piezoceramic stack can also be replaced with a rigid frame and a rotating camshaft (see FIG. 4). In this case, the elastic outer shell is prestressed to always maintain a compressive force on the camshaft. As the camshaft rotates, the linear motion of the rigid frame causes the minor axis of the outer shell to flex imparting vibration into the water.

Figure 5:
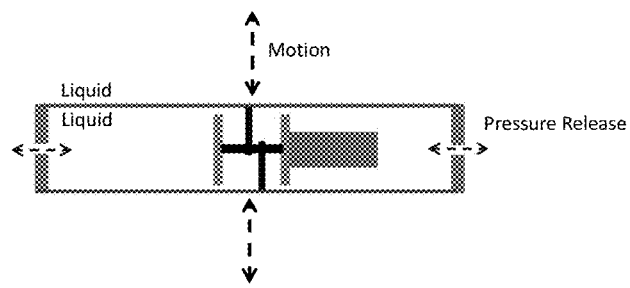

It has been described above that the internal portion of the marine vibrator source be filled with a gas (typically air), and that the pressure of the gas can be adjusted to compensate for increasing water depth. As the operating depth increases, pressure compensation via raising the internal gas pressure starts to become cumbersome and somewhat impractical. An alternate means is to have liquid on both sides of the moving transducer plates/pistons (see FIG. 5) such that the pressure across the plates remains equalized with depth. The pressure release ports ensure equal pressure and allow a pressure release which is necessary for proper operation upon movement of the plates/pistons. While FIG. 5 shows the new pressure compensation approach using the eccentric crankshaft design, the new pressure compensation approach can be used across all of the marine vibrator designs described in this application including the flextensional transducer design.

Figure 6:
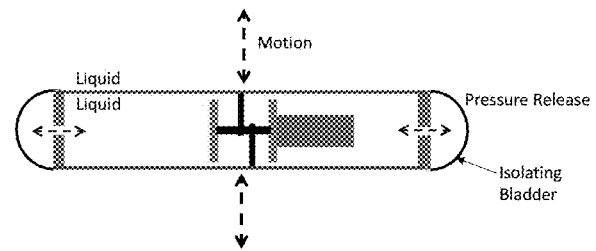
FIG. 6 illustrates use of an isolating bladder in the embodiment of FIG. 5.

The simplest way to obtain pressure equalization is to allow the liquid that the transducer is immersed in (such as seawater) to freely flow inside and outside the transducer through the pressure release ports. This is not always ideal as in the case of seawater, it tends to be corrosive, dirty, etc. To get around this, the inside liquid and the outside liquid can be separated by a flexible bladder type device (see FIG. 6) that allows the pressure to be equalized with intermixing of the fluids.

Figure 7:
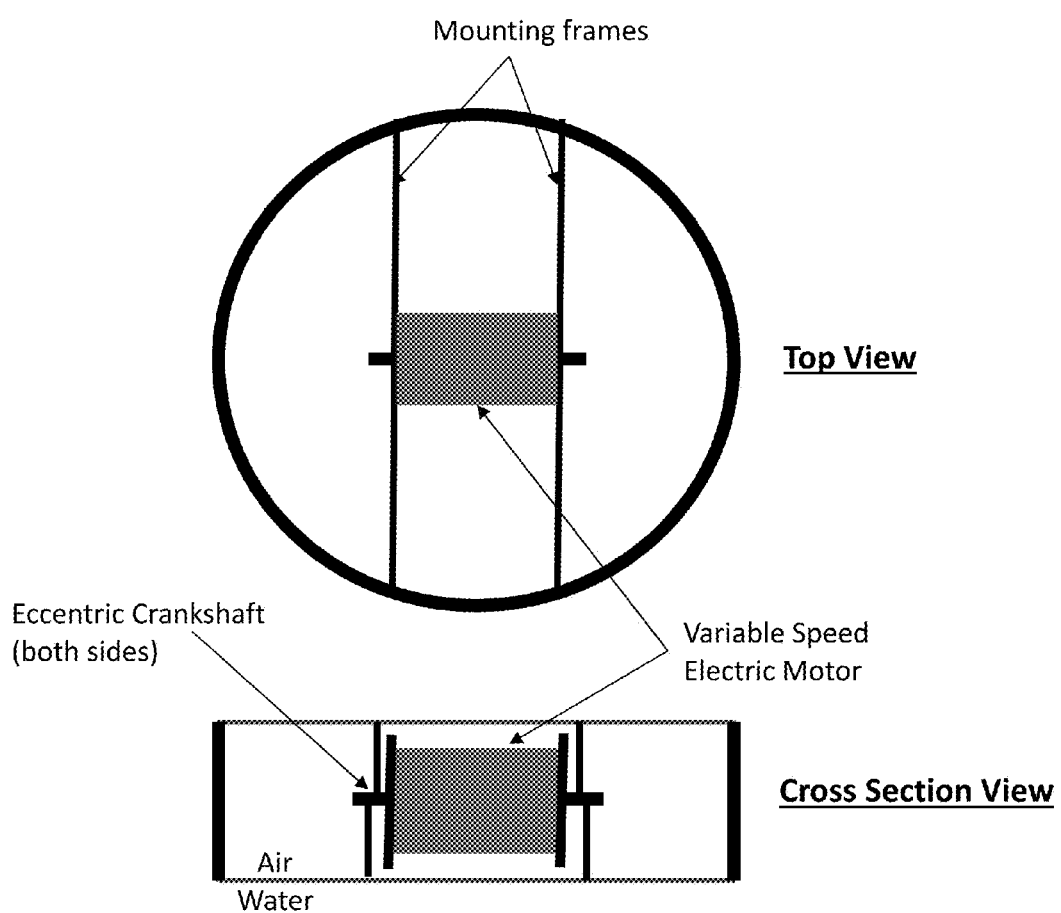
FIG. 7 illustrates an alternative embodiment of a marine vibrator in accordance with the present invention that uses a dual shaft.

An alternate configuration of the marine vibrator is shown in FIG. 7. In this case a motor with a dual shaft (continuous shaft protruding from opposite ends of the motor) is used. This allows the motor to be positioned near the centered of the transducer. Again, where the picture depicts operation via eccentric crankshafts, operation via camshaft is also possible.

Figure 8:
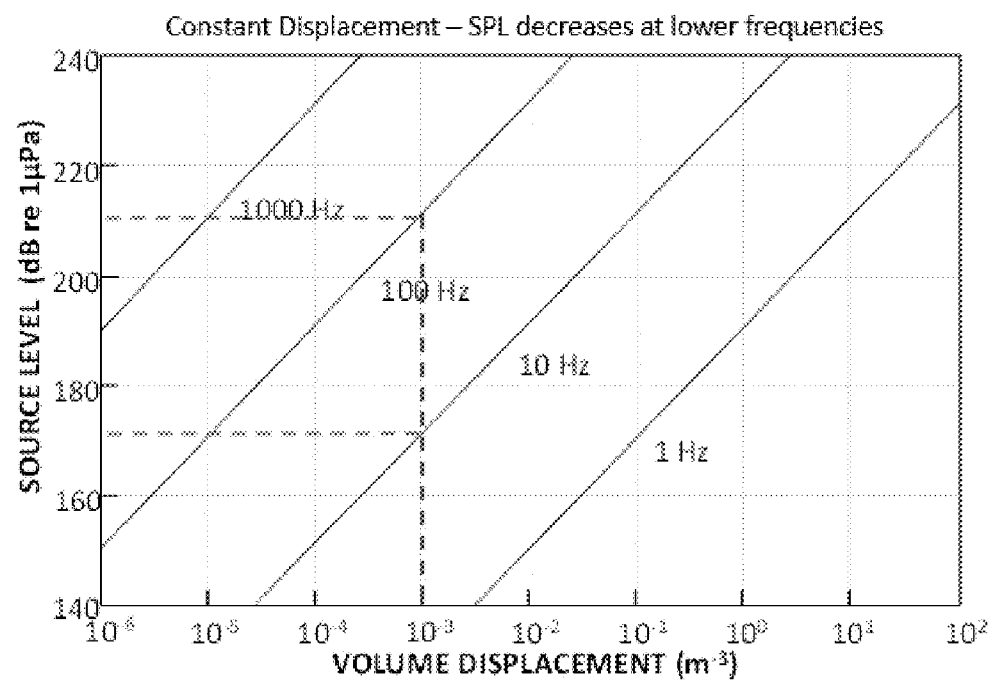

There are some applications where it may be desired that the marine vibrator's output level (typically referred to as Sound Pressure Level or SPL) be relatively constant over its frequency range (frequency is controlled by the speed of rotation of the motor). The previously discussed marine vibrator embodiments had a fixed displacement (area swept by the moveable pistons). In the case of a fixed displacement, as the speed of the motor changes (thereby changing the frequency of the harmonic vibration) the SPL changes accordingly (see FIG. 8). In this case one can see that the SPL increases from about 170 dB to 210 dB when going from 10 Hz to 100 Hz.

Figure 9:
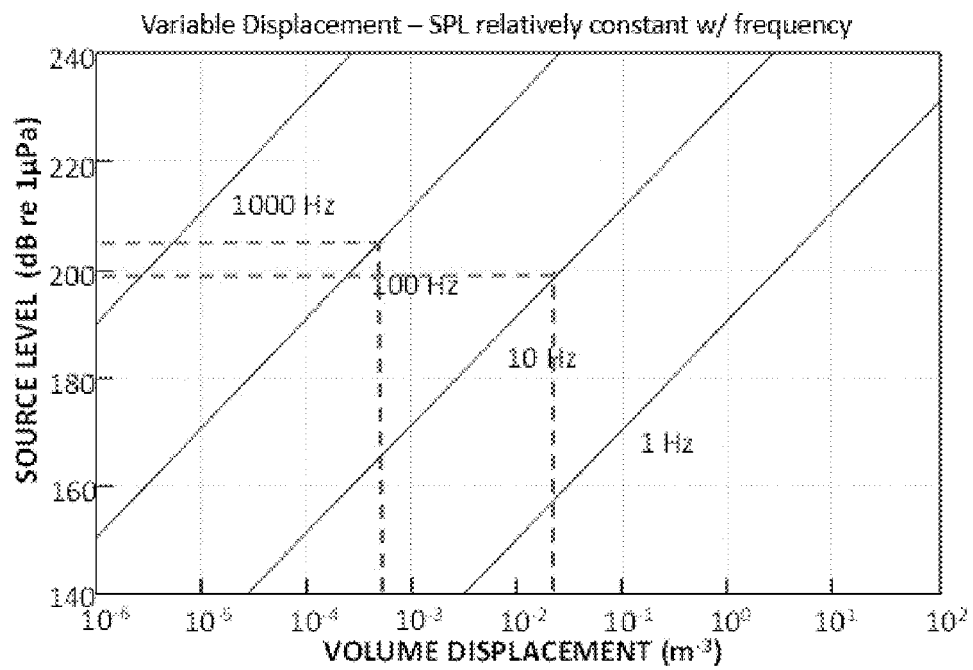
FIG. 9 illustrates how changing the displaced volume as the frequency is increased allows the Sound Pressure Level to remain relatively constant.

Alternatively, the SPL can be kept relatively constant over the marine vibrator's frequency range if the displacement of the pistons is not fixed but rather can be changed with frequency. For example, FIG. 9 depicts how by changing the displaced volume as the frequency is increased from 10 Hz to 100 Hz, the SPL stays relatively constant. (In actuality by changing the displacement appropriately with frequency the SPL can be lower, the same, or higher as the frequency of the marine vibrator is changed from 10 Hz to 100 Hz.)

In order to change the displacement (piston swept volume) with frequency, the mechanism moving the piston(s) must change its stroke length as the frequency is changed. In other words as the frequency (or rotation speed of the motor) is increased, the stroke must decrease. For the camshaft approach this can be accomplished by changing the length or stroke of the pushrod between the rotating camshaft and the moveable piston(s). For the crankshaft approach this can be accomplished by changing the length or stroke of the connecting rod between the crankshaft and the piston(s) as the speed of rotation changes.

Figure 10:
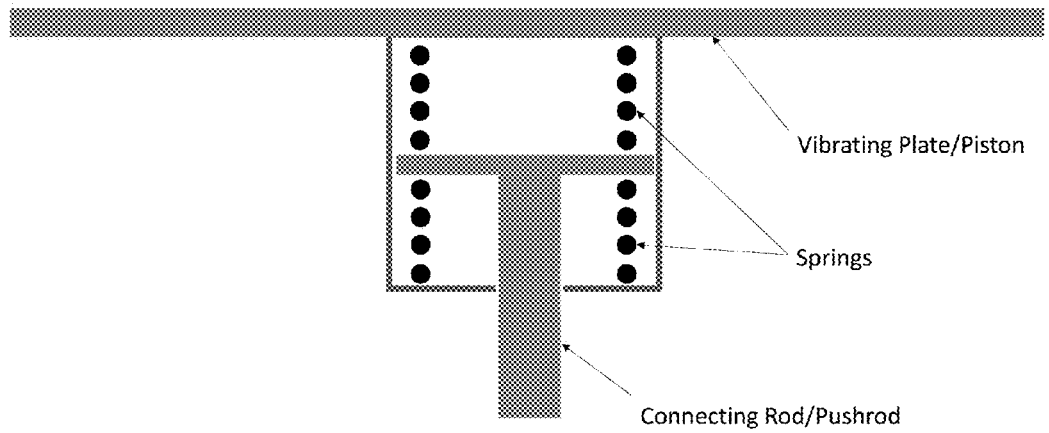
FIGS. 10 and 11 illustrate potential embodiments for changing the displacement of a marine vibrator.

There are many possible ways to change the length/stroke described above. One method is to use a spring-loaded pushrod or crankshaft that changes length with the applied load. As the speed of the motor increases, the vibrating frequency of the piston(s) increases, and concomitantly, the force pushing the piston(s) increases (by simple F=ma). As the force on the pushrod or connecting rod increases, its length will decrease as the spring(s) are compressed. For example, at low speeds the force needed to move the piston is low enough such that that the preload on the springs is not overcome and the piston moves the same amount as the connecting rod/crankshaft. At higher speeds the force needed to move the piston is higher than the preload on the springs causing them to cyclically compress such that the movement of the connecting rod/crankshaft is higher than that of the piston. FIG. 10 shows one possible embodiment.

Figure 11:
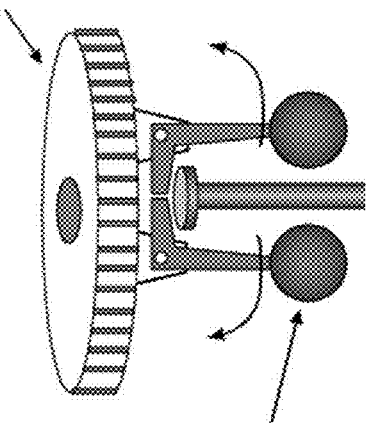

Another approach is to change the length of the pushrod/connecting rod by taking advantage of the changing centrifugal force as the speed of the motor changes. FIG. 11 depicts an example of where centrifugal force is used to change the position of a pushrod. A simple adaptation of this concept is envisioned as one means of implementing this approach.

Whereas it is preferred to use a passive means (such as those described above) to change the displacement/stroke length, active means may also be used. Some examples of active means include electrically driven actuators/positioning systems, pneumatic/hydraulic driven actuators/positioning systems, controllable variable viscosity fluids, to name just a few.

The present invention will now be further described in connection with certain preferred embodiments.

Figure 12:
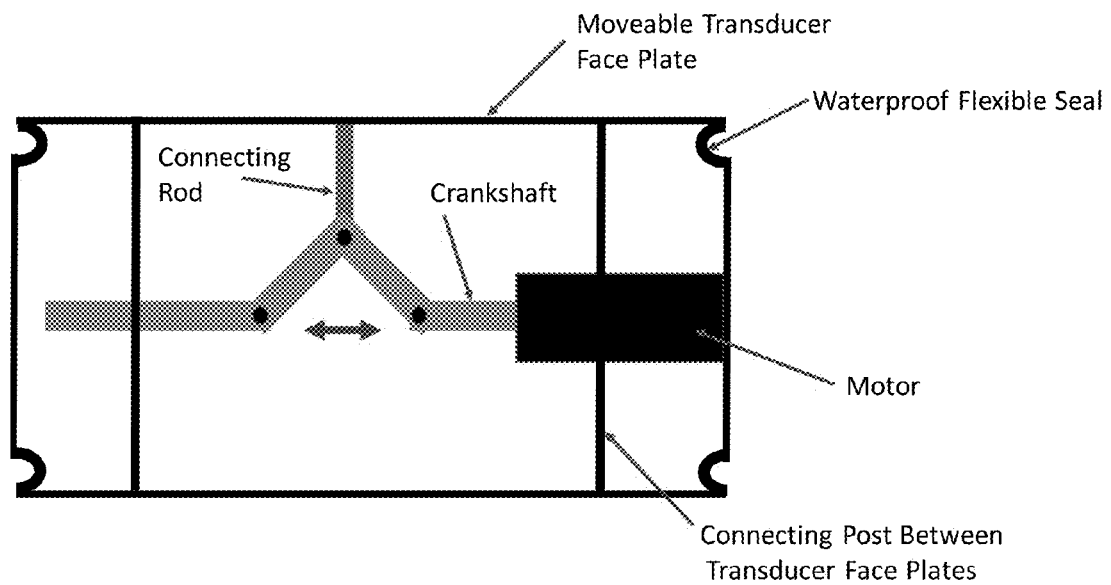
FIG. 12 illustrates an embodiment of the present invention in which a rotary motor turns a crankshaft that is connected to one of two opposed moveable transducer face plates via a connecting rod.

One preferred embodiment of the present invention is illustrated in FIG. 12. For this embodiment there are two opposed moveable transducer face plates. A rotary motor turns a crankshaft that is connected to one of the face plates via a connecting rod. The stroke of the connecting rod is varied by any of the means described in this invention by changing the distance designated by the red double-headed arrow. Flexible waterproof seals between the transducer housing and face plates allow easy movement of the face plates while maintaining a leak proof seal. The face plates are connected internally via multiple rigid connecting posts. These connecting posts cause both face plates to always move in the same direction and by the same amount as the crank shaft is rotated. Thus the internal volume is kept relatively constant and accordingly the internal pressure remains essentially constant. The internal pressure can and should still be equalized with external pressure (depth) as needed to prevent collapsing of the housing and to reduce stress on any load bearing internal components.

With opposed transducer face plates moving in opposite directions, the forces on both sides balance out and there is no net force tending to move the transducer. For the case where the opposed transducer face plates both move in the same direction this is no longer the case and there is a net resultant force trying to move the transducer. This can be minimized or overcome in many ways. One way is to couple two transducers back to back such that the net force is zero. Of course, there will be water displaced between the two transducers but this will be directed orthogonal to the movement of the face plates such that the forces cancel out.

Figure 13:
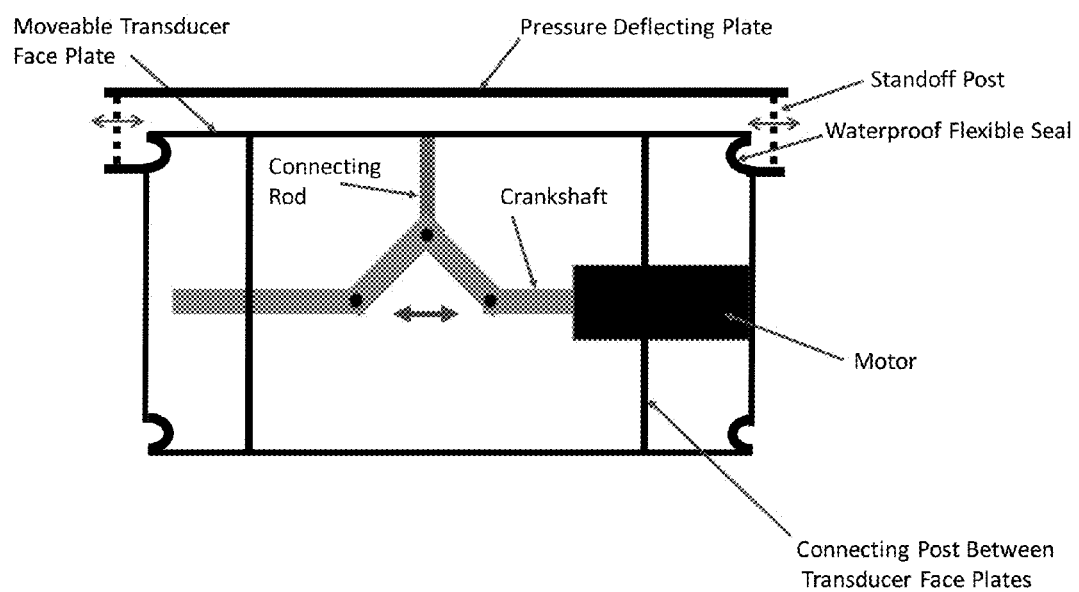
FIG. 13 illustrates the embodiment of FIG. 12 in which a pressure deflecting plate is located on the side opposite the primary sound pressure radiation direction and the back plate's displaced water volume is redirected orthogonal to its movement.

Another way is to mount a pressure deflecting plate (see FIG. 13) on the side opposite the primary sound pressure radiation direction. Thus as the "front" plate radiates pressure waves outward from its face, the "back" plate's displaced water volume is redirected orthogonal to its movement negating its contribution and thereby reducing the total resultant force by one half. Mounting the deflecting plate to a more massive structure, or making the pressure deflecting plate itself massive substantially reduces the remaining resultant movement of the transducer ensuring a majority of the energy is radiated in the primary direction. In this case, massive can be defined as having a mass that is many times the mass of the water volume displaced by the primary face (a ratio of 10:1 or greater is preferred).

Figure 14:
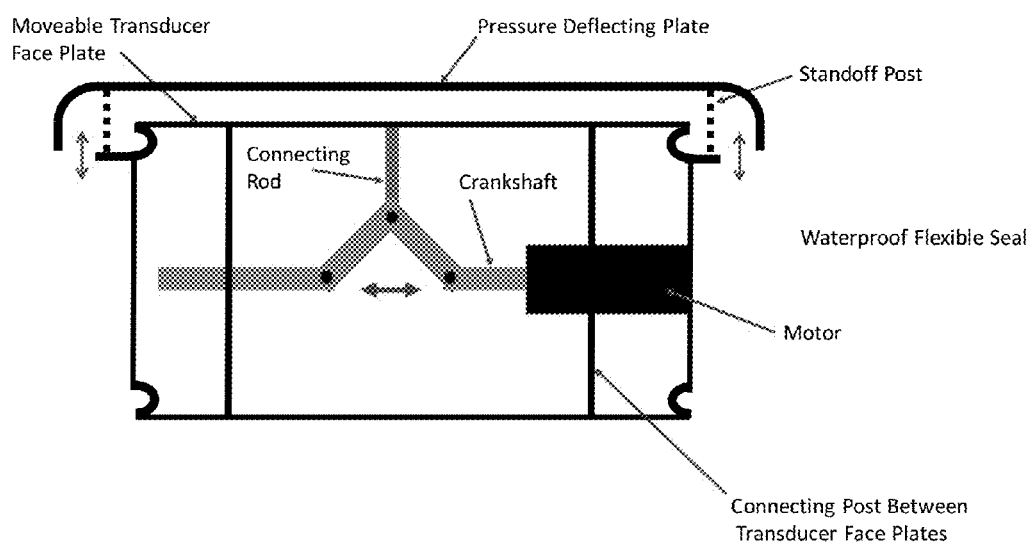
FIG. 14 illustrates a pressure deflecting plate similar to that of FIG. 13 except that the pressure deflecting plate directs the displaced water volume from the back plate in a direction to cancel out the force from the front plate.

Another method to balance the resultant forces is shown in FIG. 14. In this case, the pressure deflecting plate directs the displaced water volume from the "back" plate in a direction to cancel out the force from the "front" plate. When the "front" plate pushes outward it will tend to force the entire transducer in the opposite direction. But, at the same time the "back" plate moves inward and the displaced water creates an equal and opposite suction force which acts as a restoring force preventing the entire transducer from moving.

Some alternate/additional configurations are described hereinafter.

FIGS. 11-14 show connecting posts between opposing transducer face plates in all of the diagrams. Among other things, these connecting posts ensure equal movement of both face plates. Even without the connecting posts the opposing face plates will automatically move in conjunction with each other in order to maintain internal pressure essentially constant.

FIGS. 11-14 also show in all diagrams a single connecting rod from the rotating crank shaft to one of the transducer face plates. It is also possible to link the motion of the opposing face plates together by having a connecting rod from each face plate connected to the rotating crank shaft.

FIGS. 11-14 all have a red double-headed arrow to indicate that stroke length can be varied. Some of the means of varying the stroke length include changing passively with centrifugal force or actively via a motor operated lead screw.

Without in any way intending to limit the scope of the present invention, the present invention includes at least the following embodiments and variations in such embodiments.

1. A marine sound source having one or more moveable plates, at least one rotary motor and a connection means between the rotary motor and the moveable plate(s) capable of translating the rotary motion of the motor into linear motion of the moveable plate(s).

2. The marine sound source described in embodiment 1 where the connection means is a crank shaft and connecting rod(s).

3. The marine sound source of embodiment 1 where the connection means is via camshaft.

4. The marine sound source of embodiment 1 where the rotary motor is an electric motor.

5. The marine sound source of embodiment 1 where the rotary motor is a hydraulic motor.

6. The marine sound source of embodiment 1 where the rotary motor is a pneumatic motor.

7. The marine sound source of embodiment 1 where the moveable plate(s) are flexible diaphragm(s).

8. The marine sound source of embodiment 1 where the connection means includes a method of varying the amount of linear displacement of the moveable plate(s).

9. The marine sound source of embodiment 8 where the displacement can be changed based upon the speed of rotation of the rotary motor.

10. The marine sound source of embodiment 8 where the displacement can be changed independently of the speed of rotation of the rotary motor.

11. The marine sound source of embodiment 8 where the change in displacement is via a spring-loaded pushrod or connecting rod that changes length with the applied load. As the speed of the motor increases, the vibrating frequency of the piston(s) increases, and concomitantly, the force to push the piston(s) increases (by simple F=ma). As the force on the pushrod or connecting rod increases, its length will decrease as the spring(s) are compressed.

12. The marine sound source of embodiment 8 where the change in displacement is via weights that move due to changes in centrifugal force as the speed of the motor changes. This change in centrifugal force is translated into changing the length of the pushrod/connecting rod by mechanical linkage.

13. The marine sound source of embodiment 8 where the change in displacement is driven by an electrically driven actuators/positioning systems, pneumatic/hydraulic driven actuators/positioning systems, and/or controllable variable viscosity fluids, to name just a few.

14. The marine sound source of embodiment 1 where the moveable plate(s) are connected to an external housing via a flexible, watertight seal.

15. The marine sound source of embodiment 1 where the external housing, moveable plate(s) and flexible watertight seal(s) form a pressure boundary that can be internally pressurized with a compressible gas either manually or automatically to coincide with the external pressure.

16. The marine sound source of embodiment 15 where the internal portion of the housing is filled with a relatively incompressible fluid (preferably with a higher cavitation threshold than water) and equalizes with external fluid pressure via ports in the periphery of the housing located orthogonal to the linear motion of the movable plate(s). The internal fluid may be isolated from the external fluid via a bladder.

17. A marine sound source packaged in an alternate housing described as a flextensional shell where the flexing of the external walls is driven by a rotary motor via a connection means between the rotary motor and the flexible walls that translates the rotary motion of the motor into linear motion of the flexible walls.

18. The marine sound source of embodiment 17 where the connection means is a crank shaft and connecting rod(s).

19. The marine sound source of embodiment 17 where the connection means is via camshaft.

20. The marine sound source of embodiment 17 where the rotary motor is an electric motor.

21. The marine sound source of embodiment 17 where the rotary motor is a hydraulic motor.

22. The marine sound source of embodiment 17 where the rotary motor is a pneumatic motor.

23. The marine sound source of embodiment 17 where the connection means includes a method of varying the amount of linear displacement of the flexing external walls.

24. The marine sound source of embodiment 23 where the displacement can be changed based upon the speed of rotation of the rotary motor.

25. The marine sound source of embodiment 23 where the displacement can be changed independently of the speed of rotation of the rotary motor.

26. A marine sound source having a rotary motor, a baseplate that imparts vibration onto a surface that it is resting, a moveable mass and a connection means between the moveable mass and the baseplate that translates the rotary motion of the motor into linear motion of the moveable mass such that the cyclical movement of the moveable mass causes vibration of the baseplate.

27. The marine source of embodiment 26 where the connection means is a crank shaft and connecting rod(s).

28. The marine source of embodiment 26 where the connection means is via camshaft.

29. The marine source of embodiment 26 where the rotary motor is an electric motor.

30. The marine source of embodiment 26 where the rotary motor is a hydraulic motor.

31. The marine source of embodiment 26 where the rotary motor is a pneumatic motor.

32. A marine sound source having two opposed, moveable transducer face plates attached to an external pressure housing via flexible, watertight seals; at least one rotary motor; a connection means between the rotary motor and at least one of the moveable face plate(s) capable of translating the rotary motion of the motor into linear motion of the moveable plate(s); and a connection means between the two transducer face plates that causes them to move in unison.

33. The marine sound source of embodiment 32 where the connection means between the two transducer face plates is via a crank shaft and connecting rod(s).

34. The marine source of embodiment 32 where the connection means between the two transducer face plates is via at least one rigid connection post.

35. The marine source of embodiment 32 where the connection means between the rotary motor and at least one of the moveable face plate(s) is via camshaft.

36. The marine source of embodiment 32 where the connection means between the rotary motor and at least one of the moveable face plate(s) is via a crankshaft and connecting rod.

37. The marine source of embodiment 32 where the rotary motor is an electric motor.

38. The marine source of embodiment 32 where the rotary motor is a hydraulic motor.

39. The marine source of embodiment 32 where the rotary motor is a pneumatic motor.

40. The marine source of embodiment 32 where the external housing, moveable plate(s) and flexible watertight seal(s) form a pressure boundary that can be internally pressurized either manually or automatically to coincide with the external pressure.

41. The marine source of embodiment 32 where the connection means to the rotary motor includes a method of varying the amount of linear displacement of the moveable plate(s).

42. The marine source of embodiment 41 where the displacement can be changed based upon the speed of rotation of the rotary motor.

43. The marine source of embodiment 41 where the displacement can be changed independently of the speed of rotation of the rotary motor.

44. The marine source of embodiment 41 where the change in displacement is via a spring-loaded pushrod or crankshaft that changes length with the applied load. As the speed of the motor increases, the vibrating frequency of the piston(s) increases, and concomitantly, the force to push the piston(s) increases (by simple F=ma). As the force on the pushrod or connecting rod increases, its length will decrease as the spring(s) are compressed.

45. The marine source of embodiment 41 where the change in displacement is via weights that move due to changes in centrifugal force as the speed of the motor changes. This change in centrifugal force is translated into changing the length of the pushrod/connecting rod by mechanical linkage.

46. The marine source of embodiment 41 where the change in displacement is driven by an electrically driven actuators/positioning systems, pneumatic/hydraulic driven actuators/positioning systems, and/or controllable variable viscosity fluids, to name just a few.

47. The marine source of embodiment 32 where the unbalanced force created by the two transducer face plate moving in unison is mitigated by combining two transducers back to back such that the net force is zero. Water displaced between the two transducers will be directed orthogonal to the movement of the face plates such that the forces cancel out.

48. The marine source of embodiment 32 where the unbalanced force created by the two transducer face plate moving in unison is mitigated by the addition of a pressure deflecting plate on the side opposite the primary sound pressure radiation direction. Thus as the "front" plate radiates pressure waves outward from its face, the "back" plate's displaced water volume is redirected orthogonal to its movement negating its contribution and thereby reducing the total resultant force by approximately one half.

49. A method of mitigating the resultant unbalanced force described in the marine source of embodiment 48 by mounting the deflecting plate to a more massive structure, or making the pressure deflecting plate itself massive to substantially reduces the remaining resultant movement of the transducer ensuring a majority of the energy is radiated in the primary direction. In this case, massive can be defined as having a mass that is many times the mass of the water volume displaced by the primary face (a ratio of 10:1 or greater is preferred).

50. Another method of further mitigating the resultant unbalanced force is a modification of the pressure deflecting plate described in embodiment 48 to direct the displaced water volume from the "back" plate in a direction not orthogonal to the movement of the transducer face plates but rather in a direction to cancel out the force from the "front" plate.

Although the foregoing detailed description is illustrative of preferred embodiments of the present invention, it is to be understood that additional embodiments thereof will be obvious to those skilled in the art. For example, if my disclosures discussing the marine vibrator implied that the shape of the moving pistons/plates are circular, such circular shape is but one embodiment, and alternate shapes may be used (for example square, rectangular, etc.) to achieve the same results. Further modifications are also possible in alternative embodiments without departing from the inventive concept.

Accordingly, it will be readily apparent to those skilled in the art that still further changes and modifications in the actual concepts described herein can readily be made without departing from the spirit and scope of the disclosed inventions.

What is claimed is:

1. A marine sound source configured for use in a marine environment, comprising:
   one or more moveable plates;
   a rotary motor;
   a connection means between the rotary motor and the one or more moveable plates configured to translate rotary motion of the motor into linear motion of the one or more moveable plates; and
   means for varying an amount of linear displacement of the one or more moveable plates;
   wherein the amount of linear displacement can be changed independently of the speed of rotation of the rotary motor.

2. The marine sound source of claim 1 wherein the one or more moveable plates are comprised of one or more flexible diaphragms.

3. The marine sound source of claim 1 wherein the connection means is selected from the group consisting of a crank shaft coupled with at least one connecting rod and a camshaft.

4. The marine sound source of claim 3 wherein the one or more moveable plates are connected to an external housing via a flexible, watertight seal.

5. The marine sound source of embodiment 3 further comprising a housing and at least one flexible watertight seal which form a pressure boundary with the one or more moveable plates between an internal portion of the housing and an external portion of the housing, wherein the internal portion can be internally pressurized with a compressible gas to coincide with fluid pressure external to the housing.

6. The marine sound source of claim 5 wherein the internal portion of the housing is filled with an internal fluid which equalizes with pressure external to the housing caused by an external fluid located external to the housing via a plurality of ports in a periphery of the housing located orthogonal to a linear motion of the one or more movable plates.

7. The marine sound source of claim 6 wherein the internal fluid has a higher cavitation threshold than water.

8. The marine sound source of claim 6 wherein the internal fluid is isolated from the external fluid via a bladder.

9. The marine sound source of claim 1 wherein the amount of linear displacement can be changed based upon the speed of rotation of the rotary motor.

10. The marine sound source of claim 9 wherein the amount of change in linear displacement is accomplished via a spring loaded rod which decreases in length with applied load as the rotary motor increases in speed and the spring is compressed.

11. The marine sound source of claim 9 wherein the amount of linear displacement is changed by a mechanical linkage and movement of at least one weight due to changes in centrifugal force as the speed of the rotary motor changes.

12. A marine sound source configured for use in a marine environment, comprising:
   at least one rotary motor;
   two opposed transducer face plates attached to an external pressure housing via a plurality of flexible watertight seals;
   at least one mechanical connection between the two opposed transducer face plates which causes the two opposed transducer face plates to move in unison;
   a connection means between the at least one rotary motor and at least one of the two opposed face plates configured for translating rotary motion of the at least one rotary motor into linear motion of the two opposed transducer face plates; and
   a pressure deflecting plate configured so that a displaced water volume from the back plate is redirected orthogonal to movement of the back plate;
   wherein a first of the two opposed transducer face plates is a front plate that radiates pressure waves outwardly from its face in a primary sound pressure radiation direction and a second of the two opposed transducer face plates is a back plate.

13. The marine sound source of claim 12 wherein the connection means is selected from the group consisting of a crank shaft coupled with at least one connecting rod and a camshaft.

14. The marine sound source of claim 12 wherein the connection means is configured to vary an amount of linear displacement of the two opposed transducer face plates.

15. The marine sound source of claim 14 wherein the amount of linear displacement is varied by a passive means for varying linear displacement.

16. The marine sound source of claim 14 wherein the amount of linear displacement is varied by an active means for varying linear displacement.

17. The marine sound source of claim 12 wherein the pressure deflecting plate is configured so that it has a mass many times the mass of water displaced by the front plate.

18. The marine sound source of claim 12 wherein the pressure deflecting plate is mounted to another structure to form a deflecting plate structure and the deflecting plate structure has a mass many times the mass of water displaced by the front plate.

19. A marine sound source configured for use in a marine environment, comprising:
   at least one rotary motor;
   two opposed transducer face plates attached to an external pressure housing via a plurality of flexible watertight seals;
   at least one mechanical connection between the two opposed transducer face plates which causes the two opposed transducer face plates to move in unison;
   a connection means between the at least one rotary motor and at least one of the two opposed face plates configured for translating rotary motion of the at least one rotary motor into linear motion of the two opposed transducer face plates; and
   a pressure deflecting plate configured so that a displaced water volume from the back plate is redirected in a direction to cancel out the force from the front plate;
   wherein a first of the two opposed transducer face plates is a front plate that radiates pressure waves outwardly from its face in a primary sound pressure radiation direction and a second of the two opposed transducer face plates is a back plate.

20. A marine sound source configured for use in a marine environment, comprising:
   a housing;
   a moveable plate;
   a rotary motor;
   a connection means configured to translate rotary motion of the rotary motor into linear motion of the moveable plate within the housing; and
   a plurality of pressure release ports in a periphery of the housing located orthogonal to a linear motion of the moveable plate;

wherein the plurality of pressure release ports are configured to allow liquid from the marine environment to freely flow inside and outside the housing.

21. The marine sound source of claim 20, wherein the connection means is comprised of a connecting rod.

22. The marine sound source of claim 20, wherein an internal transducer volume is kept relatively constant as the moveable plate moves within the housing to displace a desired external water volume.

\* \* \* \* \*